United States Patent [19]

Spevack

[11] 4,192,850
[45] Mar. 11, 1980

[54] DUAL TEMPERATURE EXCHANGE SYSTEMS

[75] Inventor: Jerome S. Spevack, New Rochelle, N.Y.

[73] Assignee: Deuterium Corporation, New Rochelle, N.Y.

[21] Appl. No.: 700,296

[22] Filed: Jun. 28, 1976

Related U.S. Application Data

[62] Division of Ser. No. 492,186, Jul. 26, 1974, which is a division of Ser. No. 126,692, Mar. 22, 1971, Pat. No. 3,860,698.

[51] Int. Cl.$^2$ .................... B01D 11/04; B01D 19/00; C01B 4/00; C01B 5/04
[52] U.S. Cl. .................................. 422/255; 422/256; 423/648 R; 423/580
[58] Field of Search ............... 23/270.5 W; 423/648, 423/580

[56] References Cited

U.S. PATENT DOCUMENTS

| | | | |
|---|---|---|---|
| 2,741,543 | 4/1956 | Urey | 423/580 |
| 3,142,540 | 7/1964 | Spevack | 23/270.5 W |
| 3,871,833 | 3/1975 | Spevack | 423/580 |
| 3,907,508 | 9/1975 | Spevack | 23/270.5 W |
| 4,008,046 | 2/1977 | Spevack | 423/580 |

FOREIGN PATENT DOCUMENTS 574293 4/1959 Canada ............... 23/270.5 W

Primary Examiner—Stephen J. Emery
Attorney, Agent, or Firm—Hall & Houghton

[57] ABSTRACT

Improvements in the dual temperature exchange system wherein the feed supply substance traverses selected portions of one of the two temperature zones, said selected portions being correlated with the availability and/or cost of a supply of the feed substance concerned; e.g. (A) when a large supply of feed substance is available at relatively low cost, advantages are realized by directing at least a part of the feed-to-disposal path through only the region of the impoverishing tower wherein the feed substance has a concentration less than or substantially not greater than the concentration of the feed supply; (B) where a limited supply or a high cost supply of feed substance is involved or a high degree of extraction of the desired material from the feed supply of substance is desired, advantages are realized by employing cyclic circulation not only of the auxiliary fluid but also of the fluid maintained in exchange relation thereto, with correlated provision for enriching the two circulating streams with the desired material from a feed supply substance. Combinations of (A) and (B) are also advantageous. Also disclosed are provisions for improving the heat recovery in such systems, as well as provisions for increasing the output capacity of integrated enrichment systems without physical alteration of the intermediate and/or final enrichment stages thereof.

17 Claims, 12 Drawing Figures

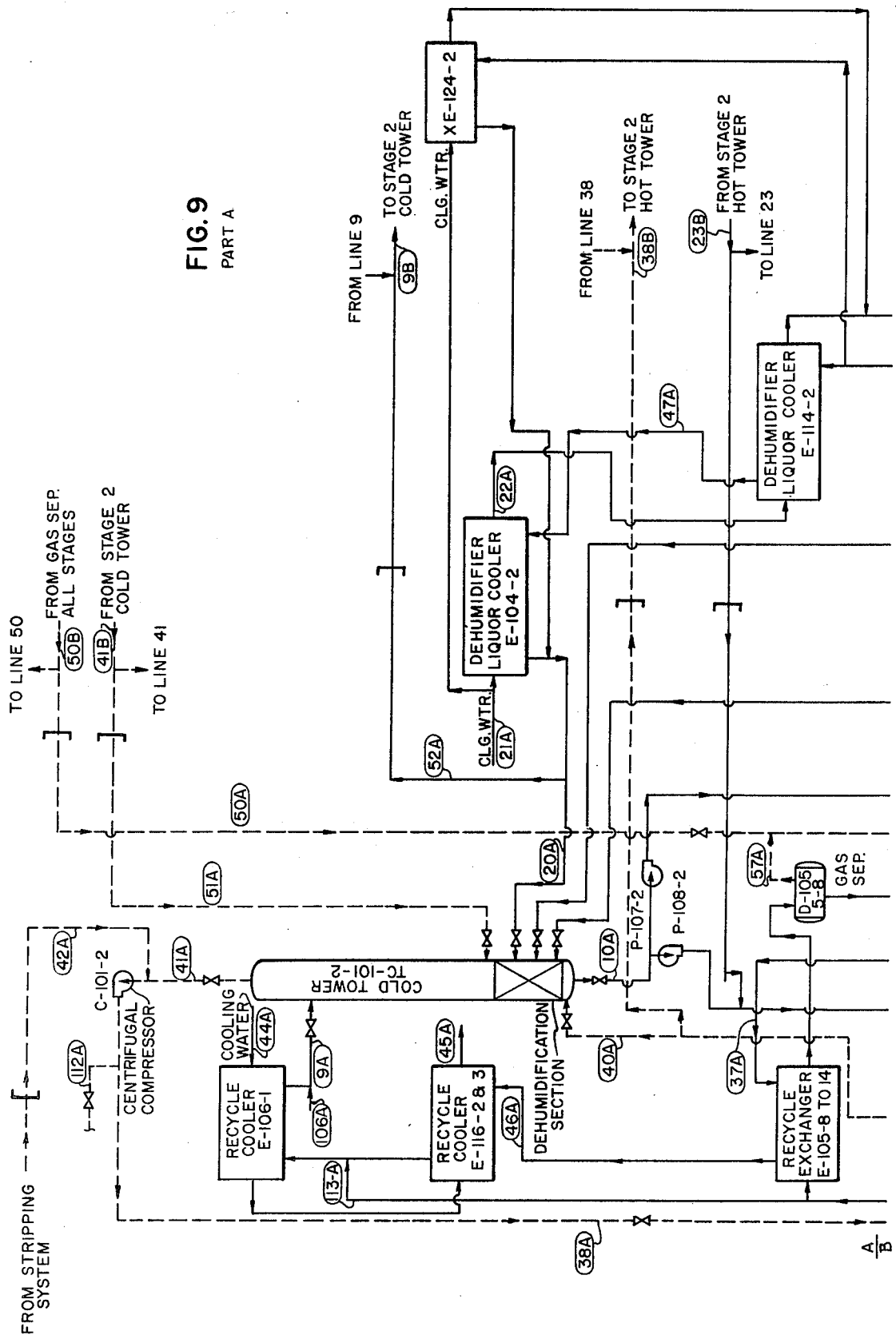

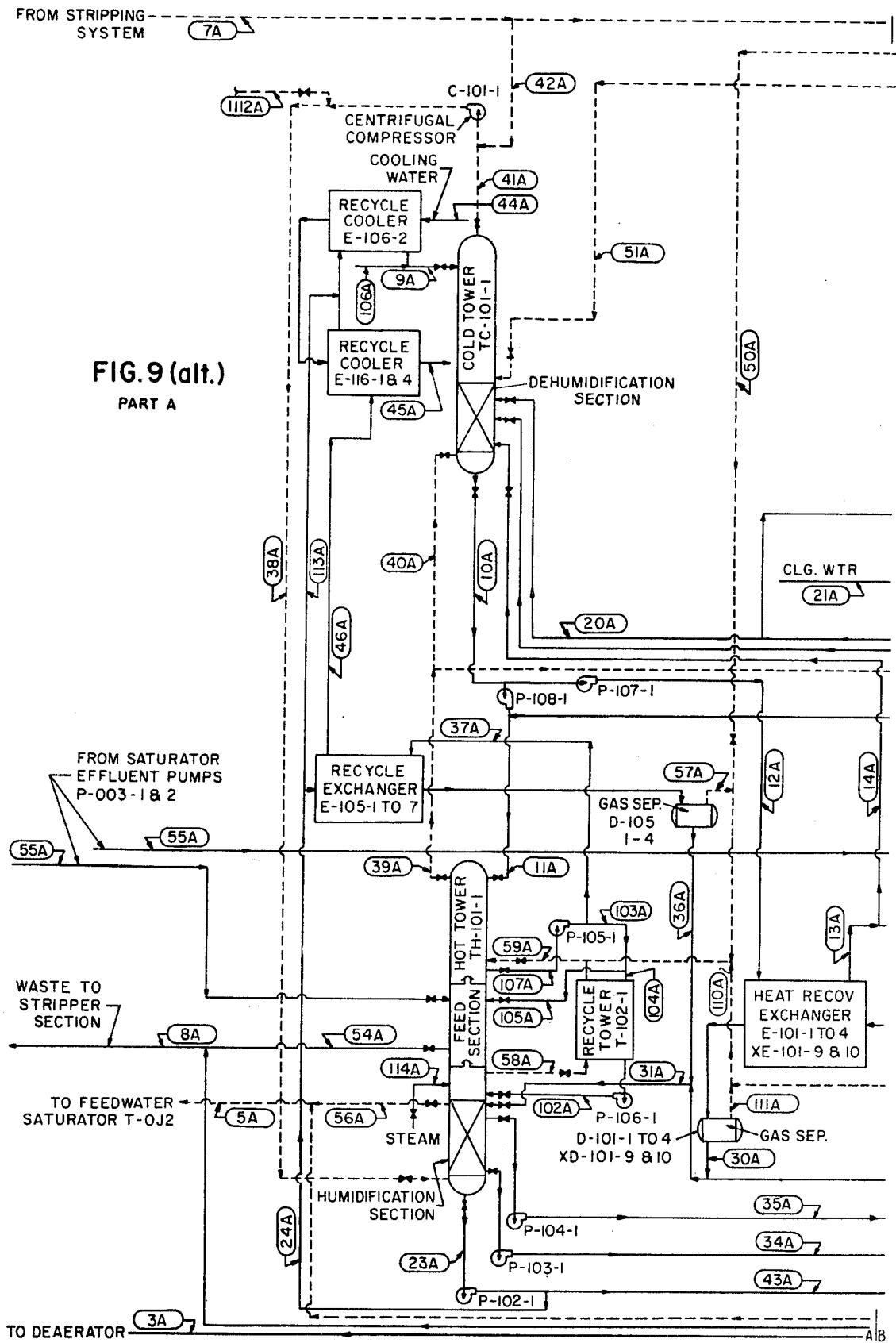

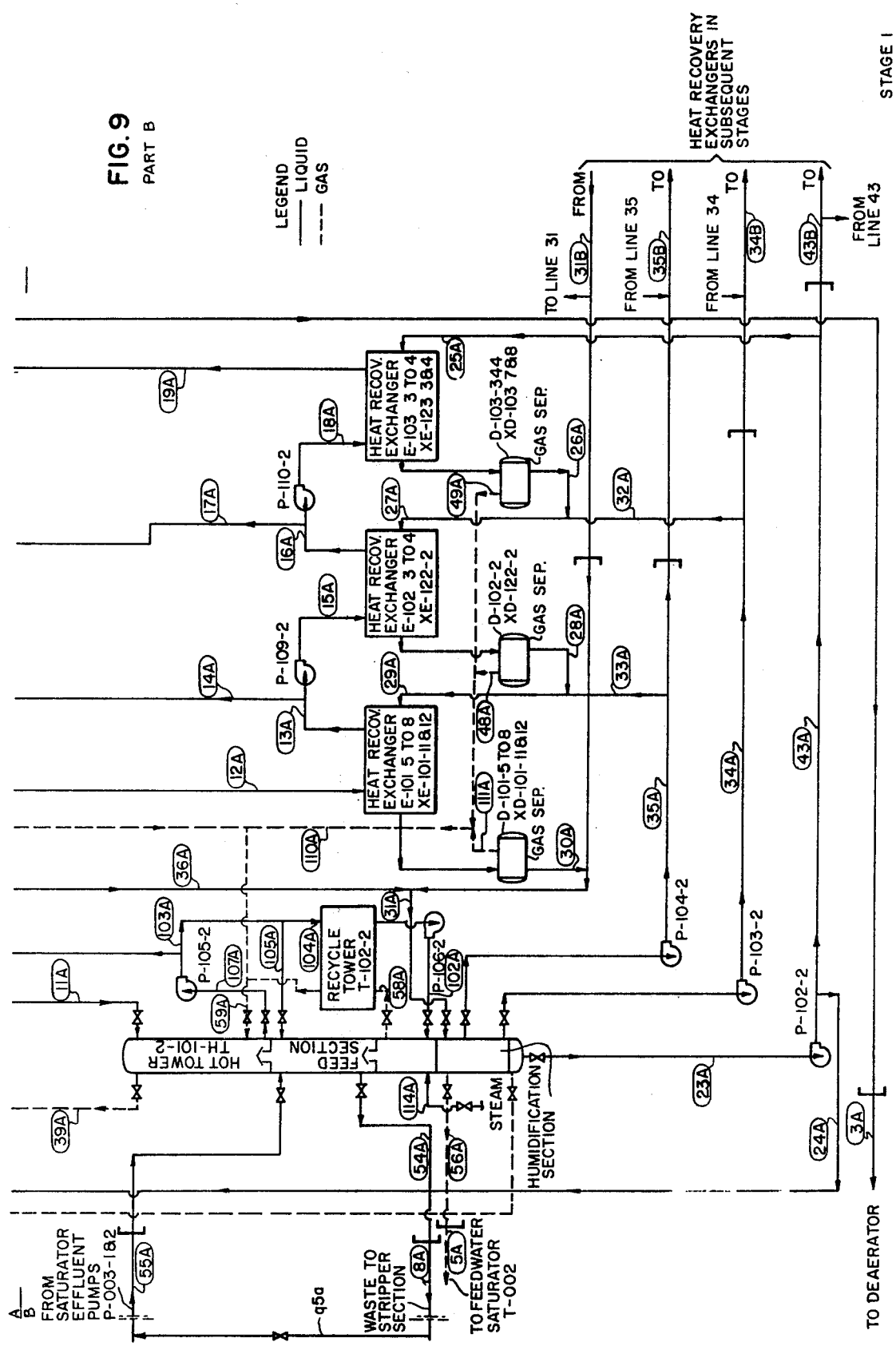

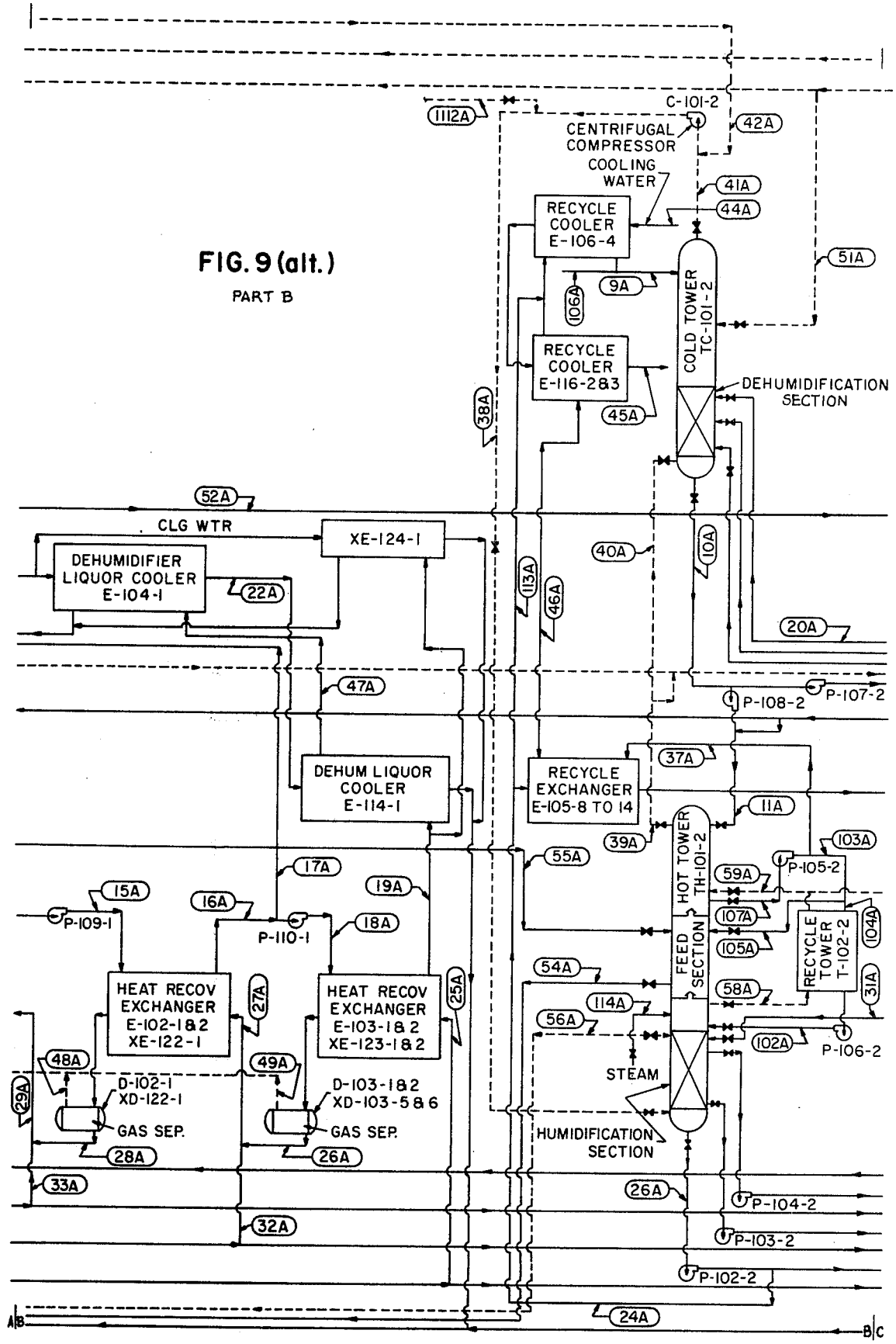
FIG. 9 (alt.)
PART B

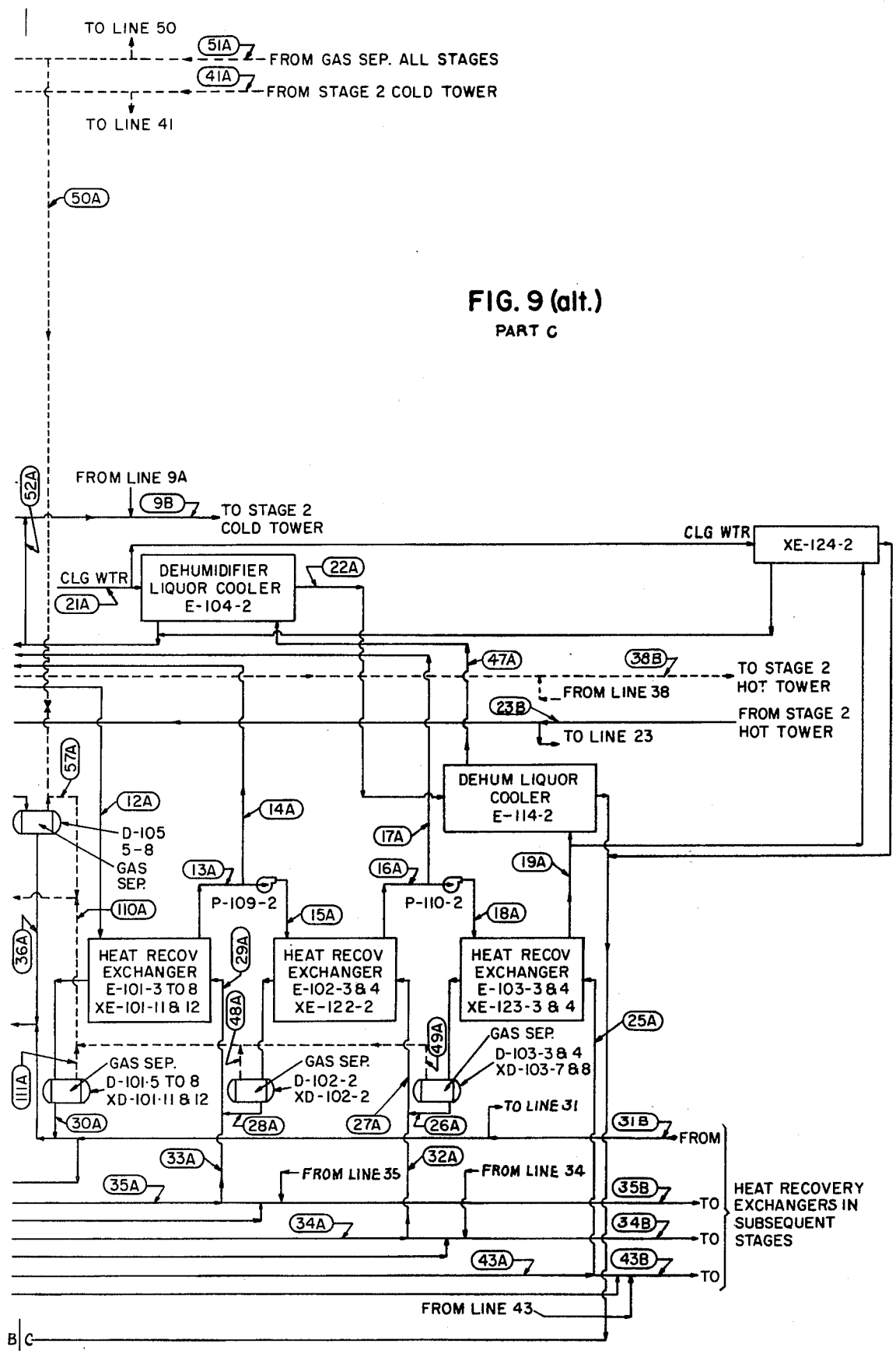

PART A
STAGE 2

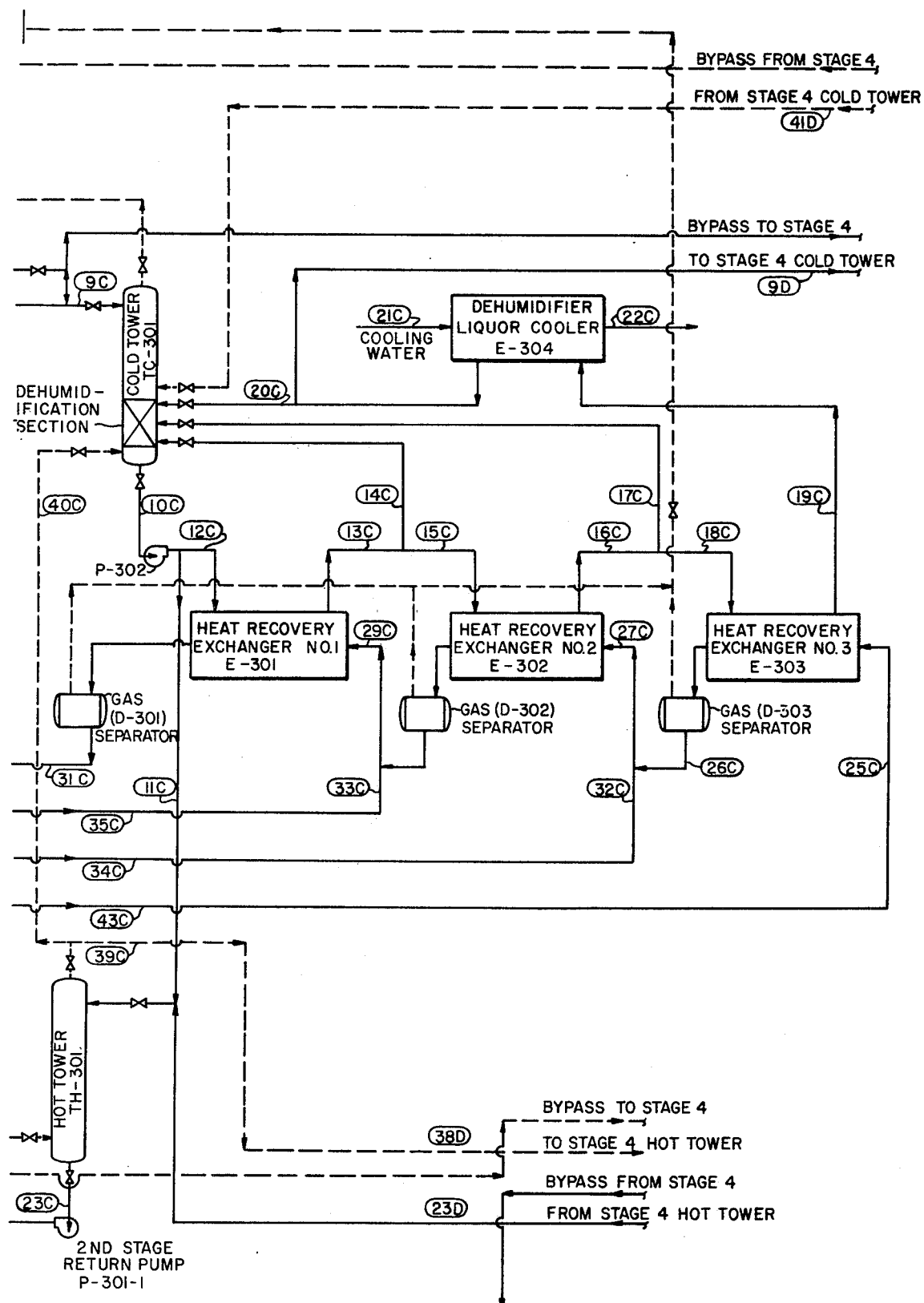

DUAL TEMPERATURE EXCHANGE SYSTEMS

This is a division, of application Ser. No. 492,186 filed July 26, 1974 itself a division of parent application Ser. No. 126,692 filed Mar. 22, 1971, now Pat. No. 3,860,698 issued Jan. 14, 1975.

BACKGROUND OF THE INVENTION

1. Field of the Invention

This application relates to improvements in dual temperature exchange system for concentrating a desired material by exchanging, at different temperatures, said desired material with another material between chemically different lighter and heavier fluids, e.g. gas and liquid, which are physically separable from each other and which are each capable of containing each of said materials.

2. Description of the Prior Art

In such dual temperature exchange systems, for instance, as disclosed in my prior U.S. Pat. Nos. 2,787,526 issued Apr. 2, 1957; 2,895,803 issued July 21, 1959; and 3,142,540 issued July 28, 1964 and my heretofore filed copending U.S. Patent Applications including, inter alia, Ser. No. 828,926, filed July 16, 1959, abandoned and continued in Ser. No. 123,815, filed Mar. 12, 1971, now U.S. Pat. No. 3,933,995 issued Jan. 20, 1976; Ser. No. 587,362, filed Sept. 26, 1966, now U.S. Pat. No. 3,907,500, issued Sept. 23, 1975; Ser. No. 587,363, filed Sept. 26, 1966, now U.S. Pat. No. 3,920,395, issued Nov. 18, 1975; and Ser. No. 587,365, filed Sept. 26, 1966 which was divided into Ser. No. 43,626, filed Apr. 30, 1970 (continued by Ser. No. 330,327, filed Feb. 7, 1973, now U.S. Pat. No. 3,871,833, issued Mar. 18, 1975) and Ser. No. 201,238, filed Nov. 22, 1971; said Ser. No. 587,365 (now abandoned) having been continued in Ser. No. 214,494, filed Dec. 30, 1971, now U.S. Pat. No. 3,940,473, issued Feb. 24, 1976 (the disclosures of all said patents and applications being incorporated herein by reference), a system is employed which comprises one or more stages of hot and cold tower pairs for contacting of said lighter and heavier fluids in countercurrent relationship. In such known systems one of the two fluids is supplied from an external source and is fed to the first tower of the first stage pair of towers, enriched in the desired material to be concentrated by preferential exchange therein, impoverished in the said desired material in the second tower of said pair to a concentration of the desired material less than that of said feed supply fluid, and discharged from the system. The other fluid is continuously circulated through the pair of towers to become enriched in the desired material in the second tower of said pair and to become impoverished in that material in the first tower of said pair. Such a system may comprise a plurality of similar or different concentrating stages of known species, and a portion of the flow of one or both of the enriched fluids being passed between said towers in a stage other than the last is also impoverished in the desired material during such passage by subjecting it to extraction of desired material therefrom in the following stage or other concentrating treatment. A portion of the enriched flow of one of the fluids is withdrawn as product from that part of the system in which its concentration of the desired material is high.

Also, in such dual temperature exchange systems, as is shown by the above mentioned prior patents, various provisions are made for moving the process fluids and adjusting the temperatures thereof as required by the process, which employ fluid pumping means, heating and cooling means, and indirect and/or direct contact heat exchange means provided to meet the particular requirements of the system.

SUMMARY OF THE INVENTION

Objects of the present invention, severally and interdependently in various combinations, are to improve productivity when the feed supply fluid is abundantly available at relatively low cost and/or to reduce equipment costs when the character of the feed supply fluid would impose costly requirements for the equipment in contact therewith in dual temperature exchange systems; to minimize the area of contact of the equipment with such feed supply fluid; to isolate such feed supply fluid in such minimized area and exclude it from mixing with other similar process fluids in the system; and/or to increase the fraction of the desired material extracted from the feed supply fluid in an economical manner; the attainment of each of these objects increasing the operating efficiency and/or decreasing the overall cost of the system per unit quantity of product.

To this end the improvements of the present invention are concerned with the inter-relationship of the flow paths of the auxiliary fluid and the fluids contacting the same in any stage of such a system, particularly in a first stage or a single stage system. The principles of these improvements are typically exemplified by their application to the concentration of deuterium by countercurrent exchange reactions between the isotopes of hydrogen at appropriate low and high temperatures, in hydrogen sulfide gas ($H_2S$) and water ($H_2O$), and wherein water is the feed supply and hydrogen sulfide is the auxiliary fluid employed in the process. In such application the heating and cooling and pumping of the fluids being passed through the cold and hot temperature towers may be accomplished in any suitable manner, e.g. in the manners disclosed in the aforesaid prior patents, or in any other manner herein disclosed or known to those skilled in the art, and the improvements of the present invention pertaining to the inter-relationship of flow paths in the said first stage are for the most part independent of the particular manners of so moving and conditioning the process fluids. In embodiments of the present invention, and in the prior art, the flow path of the total flow of the auxiliary fluid (e.g. $H_2S$) passes through the entire extent of both the hot and cold towers of the pair of towers, and in accordance with the prior art the flow path of the total flow of the other fluid (e.g. water) does likewise in countercurrent relation to the auxiliary fluid. In accordance with the present invention, however, the flow path of the feed supply fluid (e.g. water) does not pass through the entire extent of the first and second towers of the pair. Thus:

(a) In a first embodiment of the present invention the feed supply fluid (e.g. feed water) passes only through the lower portion of the second (e.g. hot) tower wherein it transfers the entire production quantity of the desired material (e.g. deuterium) to the auxiliary fluid (e.g. $H_2S$) and is then discharged from the system, the auxiliary fluid (e.g. $H_2S$) thence undergoing the exchange reactions with a separate circulation of other fluid (e.g. water) in the remainder of its flow path.

(b) In a second embodiment, modifying said first embodiment, two feed supplies to the system are employed, one thereof is utilized as in said first embodiment, and the other thereof is employed in lieu of the separate circulation of said first embodiment to contact the auxiliary fluid in the remainder of its flow path and is then discharged from the system.

(c) In a third embodiment, further modifying said second embodiment, the two feed supplies are handled as in said second embodiment except that the second feed supply fluid after contacting the auxiliary fluid in said remainder of its flow path is combined with the first feed supply fluid passing in contact with the auxiliary fluid in said lower portion of the second tower and is discharged from the system therewith.

(d) In a fourth embodiment, the arrangement is similar to said first embodiment except that the second feed supply fluid is not combined with the first feed supply fluid, and said lower portion of the second tower is divided into two separate flow sections in which said first and second feed supply fluids are separately contacted with parallel branches of said flow of auxiliary fluid.

(e) In a fifth embodiment, the arrangement is similar to that of said first embodiment except that the separate circulation of other fluid (e.g. water) which contacts gaseous auxiliary fluid in said remainder of its flow path is supplied with additional other fluid, either as feed supply fluid or as condensate from the cooling of the hot saturated auxiliary fluid, and the surplus of other fluid thus provided is combined with said first feed supply fluid as in the third embodiment.

(f) In a sixth embodiment the arrangement is similar to that of the fifth embodiment except that the surplus of other fluid is not combined with the first feed supply fluid as in the third embodiment, but instead is separately contacted with a branched flow of auxiliary fluid as in the fourth embodiment.

(g) In a seventh embodiment, the arrangement is similar to the prior art system except that instead of the entire feed supply fluid stream being discharged from the stage after passing through the second tower, a portion thereof is recirculated to the first tower, where it is mixed with the incoming supply of feed fluid. The said stream after passing through the second tower has a concentration of the desired material lower than that in the incoming feed fluid supply delivered in the first tower. Thus, in this embodiment, by recirculating a part of said impoverished feed supply fluid and mixing it with the incoming feed fluid supply the concentration of the desired material in the feed supply fluid at the top of the first tower is less than in the incoming feed fluid, thereby reducing the concentration of the desired material in the auxiliary fluid passing from the first tower to the second tower, and in turn reducing the concentration of the desired material in the feed supply fluid stream being discharged from the second tower, thus increasing the fraction of the desired material extracted from the incoming feed fluid.

(h) In an eighth embodiment the arrangement is similar to the seventh embodiment except that the incoming supply of feed fluid is introduced at the level in the first tower at which the recirculated feed supply fluid stream has become partially enriched to substantially the same concentration of the desired material as that of the incoming feed fluid.

(i) In ninth and tenth embodiments, the arrangement is similar to the third embodiment except that a portion of the feed supply fluid stream being discharged from the second tower is recirculated to the top of the first tower and combined with incoming supply of feed fluid as in the seventh embodiment or as in the eighth embodiment; and similar modifications of the fourth, fifth and sixth embodiments are also contemplated by the invention.

(j) In further embodiments of the invention, the arrangements are similar to the sixth embodiment further modified as in the ninth or tenth embodiments except that the feed supply fluid stream recirculated to the top of the first tower is derived from the surplus of other fluid which was kept isolated from said first feed supply fluid and separately contacted with a branched flow of the auxiliary fluid.

BRIEF DESCRIPTION OF THE DRAWINGS

In the accompanying drawings:

FIGS. 9 and 9(alt), are abbreviated and extended process flow diagrams of the same first stage of a system according to the invention, in which the hot and cold towers may be a single given diameter tower or a plurality of lesser diameter towers in parallel, such parallelism being indicated in FIG. 9 by the bracket-like "gang" symbols, indicating that all parts between the oppositely facing brackets may be present in multiple parallel relation, as more completely illustrated in FIG. 9(alt)

DESCRIPTION OF PREFERRED EMBODIMENTS

Figure 1:
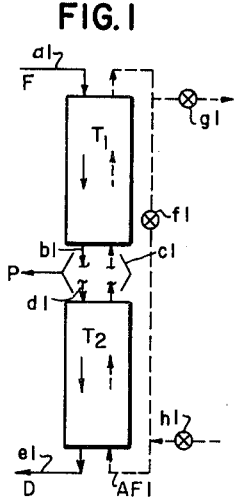
FIG. 1 is a simplified diagram of a typical prior art arrangement of the hot and cold towers T1 and T2 of a single stage dual temperature exchange system or of the first or a following stage of a plural stage dual temperature exchange system wherein: the fluids between the towers are enriched in the desired material; the intertower fluids processing system, e.g. pumps, valves, heating and cooling means, with or without additional concentrating means, is indicated by single brackets for simplicity; and the withdrawal of product fluid from the system is indicated by the arrow P.

Referring to the drawings, as above noted, FIG. 1 is typical of the prior art systems using the dual temperature process, wherein enrichment of the desired material by countercurrent direct contact exchanges between a feed supply fluid and an auxiliary fluid is effected. The feed supply fluid (e.g. water) is delivered at a-1 to the tower T1 which is kept at a temperature (e.g. cold) to effect enrichment of the feed supply fluid and impoverishment of the auxiliary fluid AF-1 (e.g. H₂S) in a desired material (e.g. deuterium) and thence passes via b-1 to the intertower fluids processing system c-1, from which the product P is withdrawn and from which the main feed supply fluid flow passes via d-1 to the tower T2 which is kept at a temperature (e.g. hot) for impoverishment of the feed supply fluid and enrichment of the auxiliary fluid, and thence discharged at e-1. Thus both fluids passing from the towers to the system c-1 are enriched in the desired material. In FIG. 1, assuming the fluids concerned are liquid water and gaseous hydrogen sulfide, and that the water is the feed supply fluid, the solid line flow path would indicate the water and the broken line flow path would indicate the auxiliary fluid. With the same fluids, if H₂S were assumed to be the feed supply fluid, and water the circulating auxiliary fluid, then the significance of the solid and broken lines would be reversed, with corresponding reversal of the ends and temperatures of the towers T1 and T2. In FIG. 1, the valve symbols, f-1, g-1 and h-1, are included to indicate that the auxiliary fluid may be recirculated in full or in part or not at all, between the towers, depending on the particular species of system being employed and whether the illustrated stage is a single stage or the first or subsequent stage of a system.

The quantity of the desired material which may be extracted from the feed supply fluid in a system according to FIG. 1, is limited (in the ideal case) according to the following relationship: $Q = (1 - K_1/K_2)$, where Q is the maximum fraction of the desired material in the incoming feed substance which may be extracted, $K_1$ is the equilibrium distribution of the desired material between the phase comprising the feed substance and the phase comprising the auxiliary substance at the first temperature zone conditions, and $K_2$ is the equilibrium distribution between said phases at the second temperature zone conditions.

Figure 2:
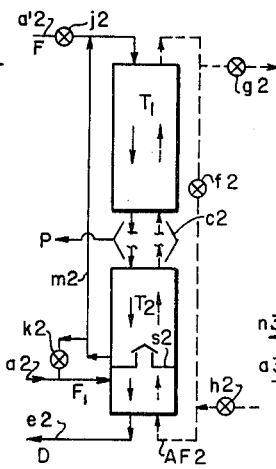
FIGS. 2 through 8 are similar diagrams of systems employing various typical embodiments of the invention.

FIG. 2 illustrates a first embodiment of the present invention which is particularly useful where the character of the feed supply fluid would impose costly requirements for the apparatus, i.e. for expensive materials of construction of the parts in contact therewith, e.g. where said feed supply is a corrosive solution such as sea-water. This embodiment minimizes the area of such contact, confines the said feed supply fluid to such minimized area, and prevents mixing of said feed supply fluid with other process fluids of the system except in such confined area. To this end, in the embodiment of FIG. 2, the feed-to-disposal path F-D is confined to the lower portion only of the tower T2, entering the same via a2 at a level below the partitioning device s2 extending across the tower which permits passage only of the auxiliary fluid AF2, the other fluid exchanging with the auxiliary fluid AF2 in the upper section of tower T2, being withdrawn from above the partitioning device s2 for recirculation through the tower T1 via conduit m2. In this FIG. 2 embodiment if a secondary non-corrosive feed supply source is available (e.g. essentially pure water or water free of corrosive contaminants, whether natural or conditioned or comprising an inhibitor solution as disclosed in the aforesaid patents) a feed F therefrom may be added to the fluid being recirculated via m2, as indicated by the valve j2 in line a'2, in which case an amount equivalent to that added will be withdrawn from the circulation, as via the conduit with valve k2. This withdrawn quantity, as shown, may be combined with the primary feed supply fluid supplied at a2, and may pass therewith through the lower part of the tower T2 and to discharge via e2. When the total flow of feed fluid phase passing through the lower part of the tower T2 to discharge D is greater than the flow thereof passing through the upper part of tower T2, the augmenting by the combination of the flow of feed fluid phase improves the efficiency of the lower portion of the tower T2 by making available for exchange with the auxiliary fluid phase a larger quantity of the desired material (e.g. deuterium). The valves f2, g2, and h2 have the same significance in this figures as do the correspondingly lettered valves in FIG. 1.

Thus by this combination a greater productivity may be obtained with a given tower size, and/or for a given productivity the relative size of the lower section of the tower T2 may be reduced. Except when otherwise stated, the descriptions herein refer to steady state conditions.

In a modified mode of operation of the system of FIG. 2, the flow of the secondary non-corrosive feed supply fluid phase through the lower portion of tower T2 may be eliminated (e.g. by closing the valve k2), the introduction of the secondary feed fluid may be effected in the section c2 (e.g. by condensation of feed supply fluid vapors from the auxiliary fluid flow therein), and in such case the excess of secondary feed fluid phase delivered from tower T2 by way of conduit m2 over the quantity thereof to be introduced into the tower T1, may be discharged from the system by way of conduit a'2 controlled by valve j2 (Basis: to conform to FIG. 2).

Figure 3:
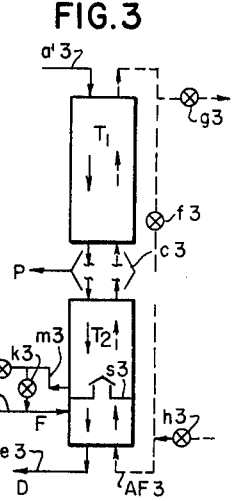

The embodiment of FIG. 3 is quite similar to that of FIG. 2, and includes corresponding parts designated by corresponding letter symbols with the ascribed symbol "3". As again, the primary feed supply fluid may be confined to the lower portion of the tower T2 between a3 and e3 and may contact the auxiliary fluid AF3 only therein, the auxiliary fluid AF3 partially enriched by this contact, then passes through the segregator s3 and contacts the secondary feed supply fluid in the upper portion of the tower T2 and in the other portions of the system. In this FIG. 3 arrangement, the secondary feed supply fluid enters the stage at a'3, this feed supply fluid phase leaving tower T2 via m3 may be delivered from the stage, as through valve n3, or may be combined with the primary feed supply fluid by way of valve k3. When the primary and secondary feed supply fluids at a3 and m3 have the same concentration of the desired material, and have the same flow rates, then the system of FIG. 3 will effect enrichment in substantially the same manner as that of FIG. 1, with the improvement that the primary feed fluid from a3 is confined to the circuit a3-e3, and (in the case of sea-water, for example) does not contact other parts of the apparatus. In this embodiment also, when the flow from a3 to e3 is in greater quantity than that through m3, an increase in effeciency of the portion of the tower below the separator s3 is obtained.

Figure 4:
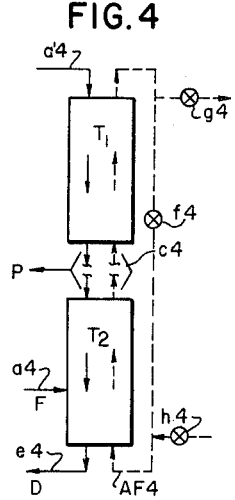

The embodiment of FIG. 4 is adapted for use under conditions in which the primary feed supply fluid entering at a4 is of a quality comparable with that of the secondary feed supply fluid introduced at a'4, and in this case no segregator corresponding to the separator s3 is required. Thus in this instance the primary feed supply is introduced directly into the tower T2—through a conventional distributor (not shown) to prevent channelling—and augments the flow of feed fluid phase in the lower portion of the tower T2 for improving the efficiency thereof. In this instance, the flow in the lower portion of the tower T2 is essentially equal to the sum of the flows in a4 and a'4, and the amount of feed fluid phase introduced through a4 may be varied up to several times the quantity supplied at a'4, in accordance with the degree of augmented flow desired in the lower part of the tower T2 and the capability of the contacting equipment to accommodate the fluid flows, bearing in mind that the fluid exiting at e4 may not become impoverished to less than the equilibrium value determined by the concentration of the auxiliary fluid AF4 entering the tower T2, and that the auxiliary fluid AF4, when it reaches the level a4, cannot have attained a concentration greater than that corresponding to equilibrium with the feed supply fluid phase at that level.

Figure 5:
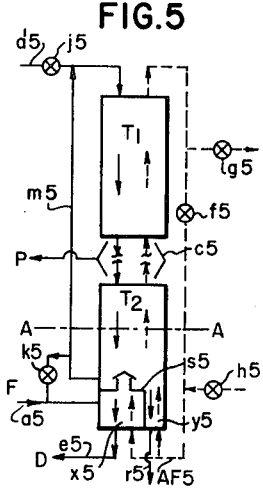

The embodiment of FIG. 5 is similar to that of FIG. 2 but the lower portion of the tower T2 is divided into separated parallel sections x5 and y5, in which the two feed supply fluids are separately contacted with branched parts of the auxiliary fluid AF5, which parts are then combined above the separator s5, the primary feed supply fluid from a5 being confined to the region within x5 by the separator s5. By this arrangement, impoverished secondary feed supply fluid which has entered the system either by way of a'5 or otherwise, e.g. by condensation from the auxiliary fluid AF5 in the system c5, may be withdrawn via r5 (at minimum concentration of the desired material, e.g. equal to that in e5), for appropriate use, e.g. for preconditioning the auxiliary fluid AF5 by use of heating and humidifying provisions as set forth herein and in the patents and applications above made parts hereof by reference.

The same result as that accomplished in the embodiment of FIG. 5 may be attained with the modified construction of FIG. 5a wherein all parts above the plane A—A are the same as those above said plane in FIG. 5, and the corresponding parts below the plane are designated by corresponding letter symbols with their own ascribed designations. This FIG. 5a construction is desirable, especially where the flow r5a is a minor quantity as compared to the flow e5a. The valved bypass q5a is provided for the purposes hereinafter described in connection with FIG. 9; and may be provided for corresponding flows in the other embodiments.

Figure 6:
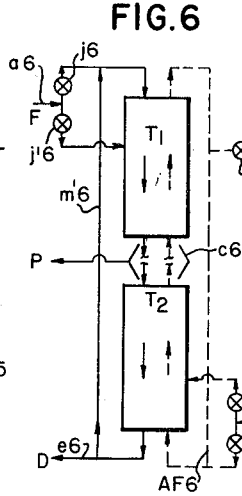

FIG. 6 illustrates another modification of the system of FIG. 1 the use of which is particularly advantageous where the available supply of the feed substance is restricted and/or where the cost of treatment of the feed supply for use in the system is significant. By extending the exchange path of the circulating auxiliary substance in both of said different temperature zones and by recirculating a portion of the fluid phase comprising the feed substance through said exchange path according to this modification it is possible to increase the fraction of the desired material which may be extracted from the feed supply over that afforded by the system of FIG. 1.

In the embodiment of this improvement as illustrated in FIG. 6, a fluid phase comprising the supply of feed substance is passed in a feed-to-disposal path (F-D) through both said different temperature towers T1 and T2 in countercurrent contact exchange relation to the auxiliary fluid phase AF6, said path traversing at least a part of the first temperature tower T1 for enriching the feed substance in said desired material and then the second temperature tower T2 for depleting the so enriched feed substance of said desired material; said supply of feed substance is delivered to tower T1; and said feed fluid phase leaving the second temperature tower is divided, a part thereof being recirculated via m'6 to said first temperature tower T1, said recirculated feed fluid phase traversing the entire countercurrent contact exchange path of said auxiliary substance in both of said different temperature towers. In the preferred embodiment of this modification, said supply of feed substance is delivered to said first temperature tower from a6 via valve j'6 and is mixed with said recirculated feed fluid phase from m'6 at the place where the concentration of the desired material in the feed fluid phase in tower T1 is partially enriched to about the same concentration of the desired material as that in the feed supply fluid delivered via a6.

The fraction of the desired material which may be extracted from the feed supply fluid from a6 by use of this modification is independent of the limitations of the system of FIG. 1 and is expressed substantially by the following relationship: $Q=(1-X_w/X_f)$, where Q is the fraction of the desired material in the feed substance supply which may be extracted, $X_f$ is the concentration of the desired material in the feed substance supply, and $X_w$ is the concentration of the desired material in the feed substance which passes from said second temperature zone. Variation in prescription of the fraction of the desired material to be extracted is reflected in variable apparatus requirements as effected by the ratio of the quantities of feed substance recirculated via m'6 and feed substance supplied to the system via a6.

In an alternative to the preferred FIG. 6 arrangement, the feed supply fluid from a6 may be commingled with the more impoverished feed supply phase fluid recirculating via m'6, and both these fluids may be introduced into the top of the tower T1. While this arrangement may be advantageous in certain circumstances, it is not wholly independent of the limitations of FIG. 1, above discussed, and in effect is a compromise between the FIG. 1 arrangement and that of the preferred embodiment of FIG. 6.

As is also illustrated in FIG. 6, when the auxiliary fluid recirculation AF6 is provided with a feed for additional auxiliary fluid partially enriched in the desired material as compared with the recirculated portion AF6, it is preferred to introduce the latter by way of valve h'6 to the level in the tower T2 where the fluid AF6 has been partially enriched to substantially that of the added supply of auxiliary fluid. However, with less independence from the limitations of FIG. 1, such added auxiliary fluid may be introduced through valve h6 to be mixed with the recirculated fluid AF6 before it enters the tower T2. In either embodiment a quantity of the auxiliary fluid, equivalent to that added, is withdrawn as via valve g6.

Figure 7:
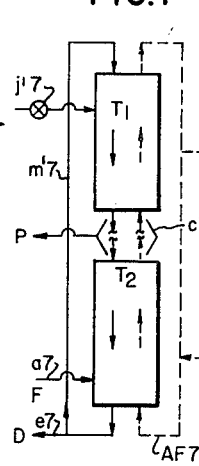

The embodiment of FIG. 7 combines advantages of those of FIGS. 6 and 4, i.e. it affords the advantages of augmented flow of feed supply fluid in the lower portion of tower T2, with the advantage of recirculation of feed supply fluid via m'7 and introduction of secondary feed supply fluid via j'7 to a point of substantially equal concentration in the tower T1.

Figure 8:
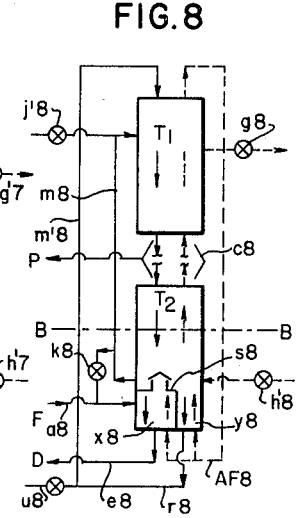

The embodiment of FIG. 8 combines advantages of the embodiment of FIGS. 7 and 5. The auxiliary fluid AF8 circulates through the entire extent of the towers T2 and T1. The feed supply fluid path F-D is confined to the tower portion x8 by the separator s8, and the flow of auxiliary fluid AF8 is branched and divided between the tower portions x8 and y8. The feed supply fluid phase passing in tower T2 is in part recirculated via m8 between levels in towers T2 and T1, where its concentration is substantially equal to that of feed supply a8 which is greater than the concentration of the feed supply fluid phases in r8 and e8, and in other part passed through the tower portion y8. The more impoverished feed supply fluid phase thus obtained from r8 is recirculated via m'8 to the top of tower T1, wherein it is partially enriched to the concentration of the secondary feed supply, which is introduced via valve j'8 if available and used, in which case substantially the same quantity of feed fluid phase is withdrawn from the recirculation via k8 or via u8.

Figure 8A:
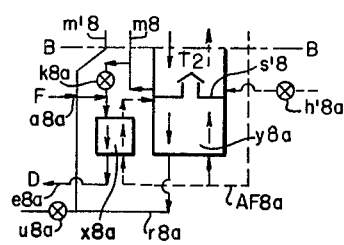

The same result as that accomplished in the embodiment of FIG. 8 may be obtained with modified constructions, e.g. as exemplified in FIG. 8a, wherein all parts above the plane B—B are the same as those above that plane in FIG. 8, and the corresponding parts below that plane are designated by corresponding letter symbols with their own ascribed designations. This FIG. 8a combination locates the tower portion x8a externally of the main tower T2 leaving the lower part of the main tower T2 for portion y8a. This arrangement is desirable especially when the flow e8a is to constitute only a minor amount as compared to the flow r8a. The withdrawal to m8 in FIG. 8a is from a suitable collector s'8, which separates that part of the fluid phase to be withdrawn from the other part of said fluid phase shown passing through y8a to r8a in the tower. It will be appreciated that instead of locating the tower portion x8a externally, it may be located internally of the main tower and the tower portion y8a may be located externally following the scheme of FIG. 5a, and that the structure schemes of FIG. 5a or 8a may also be applied to any of the embodiments of FIGS. 2, 3, 5 and 8 hereof.

In FIG. 9—or FIG. 9 (alt)—there is shown the process flow diagram of the first stage of a system according to the invention, in which the hot and cold towers of the pair are each made up of a plurality of lesser diameter towers in parallel, such parallelism in FIG. 9 being indicated by the bracket-like "gang" symbols, indicating that all parts between the oppositely facing brackets may be present in multiple parallel relation, as more completely illustrated in FIG. 9 (alt).

Figure 10:
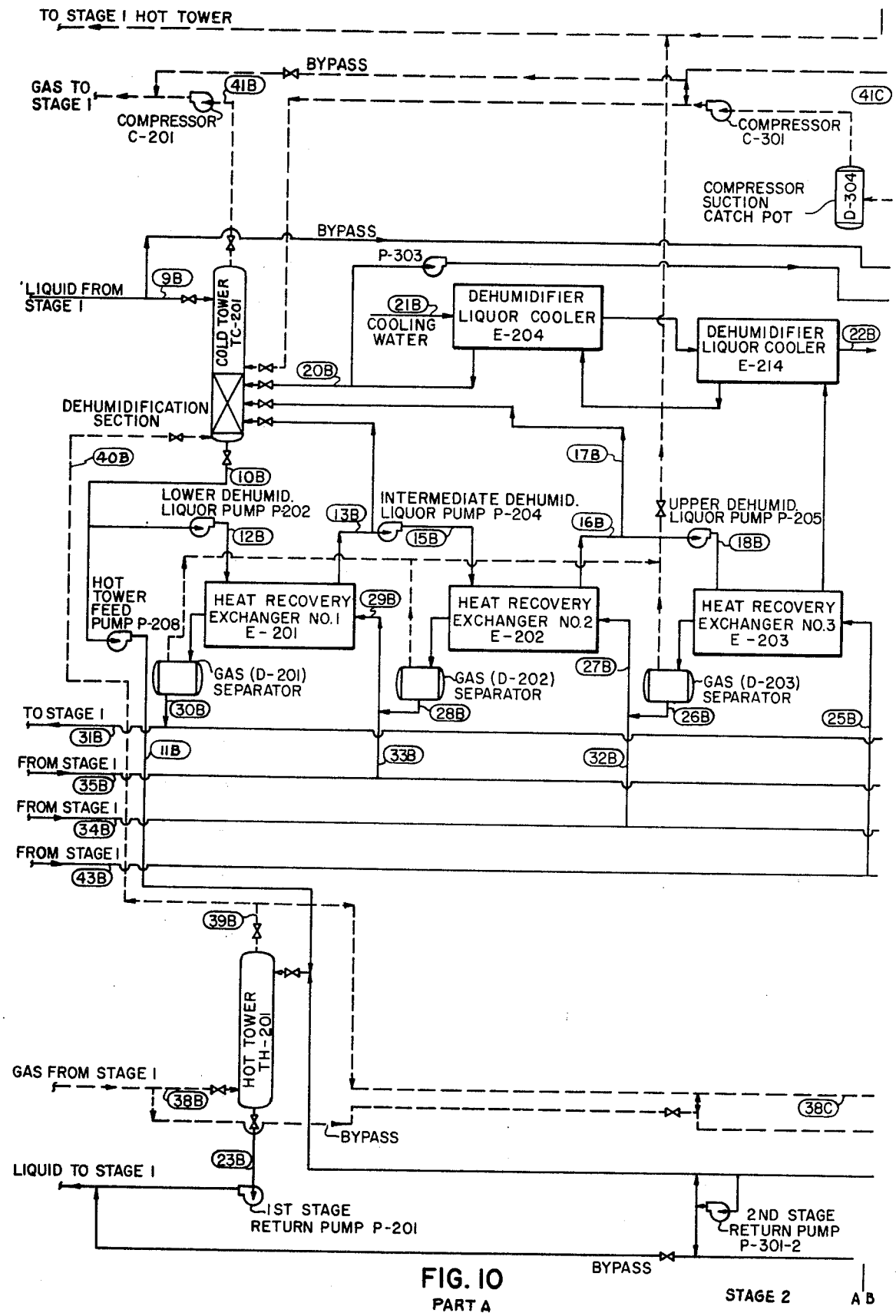
FIG. 10 is a similar process flow diagram of the second and third stages of an enrichment system, which may be fed from, and discharge to, the first stage of FIG. 9 or 9(alt); and may in turn feed, and receive discharge from, further concentrating and product finishing stages, which may be as set forth in any of my aforesaid prior patents or heretofore filed copending U.S. patent applications or my copending U.S. patent application Ser. No. 126,623, filed concurrently herewith.

These figures and FIG. 10 illustrate the first, second and third stages of a heavy water plant of the dual temperature hydrogen sulfide water-type, embodying the invention. Such heavy water plant comprises a feed and effluent treatment section, described in an application Ser. No. 126,498 filed concurrently herewith and incorporated herein by reference, which provides a treated water, e.g. sea-water which has been cleaned, deaerated, decarbonated, heated, and saturated with hydrogen sulfide at the hot tower temperature and pressure, e.g. 130° C. and 325 p.s.i., and thereby also provided with a dissolved salt component of hydrosulfide and sulfide ions. As shown in FIG. 9, this feed-water is delivered by pipe 55A to the feed section lower portion of the hot water, corresponding to portion X5a of FIG. 5a above, from which the effluent sea water, impoverished in deuterium content, is discharged via pipe 34A to the effluent treatment section of the system above mentioned, wherein heat is recovered from the effluent for in part heating the said feed water being supplied via pipe 55A, and dissolved hydrogen sulfide gas is recovered from the effluent and returned via pipe 42A for reuse as auxiliary fluid in the system.

Still referring to FIGS. 9 and 9 (alt), since the first stage equipments are duplicated in parallel, only one of them need be described. This one comprises cold tower TC-101-2 and hot tower TH-101-2, with accessory equipment. Between the cold and hot towers is a dehumidification system, shown as comprising an element constructed integral with the lower part of cold tower, wherein water is condensed and heat is recovered from the hot $H_2S$ gas, the heat recovery being effected at a plurality of consecutively lower temperatures by separate branches of a cyclic flow of water and condensate hereinafter more fully described.

The enrichment systems shown in FIG. 9 or 9 (alt) and 10, are those directly involved in the initial concentration of deuterium oxide in natural water e.g. sea-water, from about 0.015 mol % to approximately 7 mol percent, as $D_2O$, when provided with the two parallel stage 1 hot and cold tower pair units as shown in FIG. 9 (alt); and to approximately 15 mol percent when four such parallel units are provided.

Stage 1, FIGS. 9 and 9 (alt), contains a set of towers, or a plurality of sets of towers operating in parallel. Each set consists of a hot tower TH-101-2 operating at the hot temperature, e.g. 130° C., a cold tower TC-101-2 operating at the cold temperature, e.g. 30° C., and a recycle tower T-102-2 which corresponds to the lower hot tower section y5a in FIG. 5a. Inside all towers are countercurrent contacting elements, e.g. perforated plates called seive trays, which provide intimate countercurrent contact of the liquid and gas streams. Each set of towers operates with its own $H_2S$ compressor, C-101-2, process water pumps, heat exchangers and gas separators, as shown.

The said stage 1 cold tower vessels in this embodiment are vertical pressure vessels approximately 20 feet in diameter and approximately 185 feet high. Each said vessel comprises, in the form shown, a cold tower or water enriching exchange section and a dehumidification section for hydrogen sulfide gas cooling constructed therebelow.

The said stage 1 hot tower vessels are vertical pressure vessels approximately 22 feet in diameter and approximately 200 feet high. Each said vessel, in the form shown, comprises a hot tower or water impoverishing exchange section which includes the sea-water feed section and the parallel external recycle section; and a humidification section for gas heating and humidifying is constructed as an element in the lower part of the vessel.

Each of the said exchange sections of the stage 1 hot and cold tower pairs in this illustrative embodiment, for the purpose hereinafter described, is provided with a total of 130% of the calculated number of plates that would be employed if the illustrated two tower pairs in FIG. 9 (alt) were to be operated at output rates to effect a 3-fold enrichment of deuterium content of the water delivered to the second stage as compared to the sea water feed supply.

Seal trays are provided at the bottom and at the top of the feed sections in the hot towers. As indicated in connection with the separator s5a in FIG. 5a, gas can pass upward through the seal trays, but water cannot pass through them to the other sections of the tower. The feed section is equipped with a mist eliminator and a wash tray (not shown) to remove entrained sea-water spray from $H_2S$ process gas ascending through the seal tray.

Figure 5A:
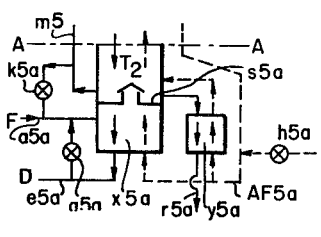
FIGS. 5a and 8a are similar diagrams of modified physical embodiments of the systems of FIGS. 5 and 8, being the same as FIGS. 5 and 8 above the planes A—A and B—B, respectively.

The stage 1 recycle towers T-102-2 corresponding to elements y5a in FIG. 5a, are vertical pressure vessels approximately 11 feet in diameter and approximately 50 feet high, provided with trays for countercurrent exchange between the fluids as in the other sections of the towers.

All tower shells are made of carbon steel. The hot tower sea-water feed sections are internally clad with Inconel. All sieve trays are made of stainless steel except in the hot tower feed sections where the trays are also made of Inconel. The lower portion of the hot tower, comprising the parallel feed section and recycle tower section as shown, accounts for about 20% of the total number of theoretical trays or contacting elements in the hot tower.

Gas from the top of stage 1 cold tower TC-101-2, via 41A, which also receives via 42A a stream of $H_2S$ from the effluent system as above noted, passes via 38A from the discharge of the stage 1 gas compressor C-101-2 to the bottom of the humidification section in the lower part of the stage 1 hot tower vessel TH-101-2, where it flows upward through the humidification section in countercurrent direct contact with a cyclic flow of hot water, and is heated thereby and humidified by evaporation of a portion of said flow of hot water. Steam injected via 114A into the lower part of hot tower vessel at the top of the humidification section further heats and humidifies the gas to hot tower conditions in this element of the assembly. A portion of the hot gas is withdrawn via 56A for use in the feed water saturator above mentioned, where accumulations of inert gases are also purged from the process gas of the system. A minor portion of the so heated and humidified gas via 58A is passed to the recycle tower T-102-2, thereby bypassing the feed section of the hot tower. This gas enters the bottom of the recycle tower and passes upward, stripping deuterium from the countercurrent flow of process water therein. This deuterium-enriched gas leaves the top of the recycle tower and reenters the hot tower via 59A, at the bottom of the process water impoverishing or deuterium stripping section, above the feed section.

Parallel to the recycle tower flow most of the heated and humidified gas continues upward through the seal tray at the bottom of the sea-water feed section of the hot tower and through said feed section, stripping deuterium from the sea-water feed. This enriched gas continues upward to the stripping section through the seal tray at the top of said feed section, mingling with additional gas recycled via 59A from the gas separators associated with the liquid heating elements of the system and from said recycle tower. The gas strips more deuterium from the process water in the stripping section and then leaves the top of the hot tower via 39A.

Said gas flow via 39A is split between the stage 1 cold tower and the stage 2 hot tower. One part thereof enters the dehumidification section under the stage 1 cold tower via 40A and passes upward, becoming cooled and dehumidified by the countercurrent cold water flows, with condensation of water vapor previously added to the gas flow in the humidification section and by the steam flow from 114A. The condensate so formed mixes with the water flow and passes from the dehumidification section via 10A. As hereinafter described, a portion of the water required for humidification is recycled to the humidification section at the bottom of tower TH-101-2 and the excess of water developed from the steam injection at 114A, after use as a wash via 105A to eliminate feed water entrainment by gas leaving the feed section of tower TH-101-2, exits from said feed section via 54A. The cooled, dehumidified gas continues upward through the water enriching section of tower TC-101-2, transferring deuterium to the process water therein. Additional gas returning from the stage 2 cold tower, via 41B, FIG. 10 and 51A, FIG. 9, enters the bottom of the cold tower of stage 1 where it joins the gas flow from the dehumidification section. The gas leaves the top of the cold tower via 41A, and is returned to the bottom of the hot tower by the stage 1 gas compressor C-101-2.

Feedwater (e.g. treated sea-water) is pumped from the feedwater $H_2S$ saturate by pump P-003-2 and via 55A enters the top of the feed section of the stage 1 hot tower, and deuterium is stripped therefrom by the countercurrent flow of $H_2S$ gas passing therethrough. The deuterium depleted feedwater then discharges via 54A and 8A to the effluent treating system referred to above. In the illustrative embodiment of FIG. 9 and 9 (alt) the quantity of sea-water delivered via 55A to the feed section is about 115% of the quantity of process water delivered via 9A to the cold tower.

A portion of the water discharged via 10A from the dehumidification section below the stage 1 cold tower is pumped by the hot tower feed pump P-108-2 to the top of the stage 1 hot tower via 11A. This water flows downward in the hot tower, transferring deuterium to the countercurrent flow of hot process gas therein, and is thus withdrawn from the bottom of the stripping section of the hot tower above the upper seal tray of the feed section via 107A, and is split into three streams. The main stream via 37A, 46A and 9A is returned to the cold tower as process water. The second stream via 103A, 104A passes through the recycle tower and then via 102A to the humdification section. The third stream via 103A, 105A is delivered to serve as wash water for gas entrainment elimination in the hot tower feed section as aforesaid, and then mixed with sea-water feed supply. In this illustrative embodiment the total quantity of water passing through the parallel sections of the lower portion of the hot tower is almost 150% of the quantity of water passing through the cold tower.

The water entering the recycle tower from 104a passes downward, transferring deuterium to the countercurrent flow of hot humidified gas supplied via 58A, is discharged from the bottom of the recycle tower, and is pumped by the pump P-106-2 via 102A to the top of the humidification section to provide water for humidification of the gas recirculating from the cold tower to the hot tower.

Process water entering the top of the stage 1 cold tower via 9A is supplied from process water withdrawn from above the feed section of the hot tower via 107A as aforesaid. This water is pumped by pump P-105-2 via 37A through a recycle heat exchanger train E-105- and two recycle coolers E-116- and E-106- before entering at the top of the cold tower via 9A. it is joined by the aforesaid secondary non-corrosive feed supply via 106A and by a recycled impoverished water stream withdrawn via 23A, 24A, 113A from the bottom of the humidification section. This recycled stream thus mixes with the main body of process water in the cold tower and serves to prevent the buildup of dissolved salts, which are relatively non-volatile substances, resulting from the water evaporation from the solution thereof in the humidification section. It also in part provides means for effecting a reduction in the concentration of deuterium in the fluids at the top of the cold tower and in turn at the bottom of the hot tower whereby a greater degree of recovery of the deuterium from the feed supply may be achieved as described above for the system of FIG. 8.

Another aspect of the present invention is the bypass pipe preceding the intake of the feedwater pump P-003-2 which extends thereto from the discharge pipe 8A for recycling through the feed section all or part or none of the sea-water discharge via pipe 8A. Suitable valves for control thereof are provided. Use of this by-pass is particularly advantageous to avoid shutdown of operation of the entire system when the feed supply becomes wholly or partially unavailable for delivery to the system. Shutdown is costly in that the enriched fluids in the towers drain and mix with the depleted fluids requiring an extensive and costly period to resume operations and to reestablish the steady state enrichment gradients in the towers. Since both the sea-water feed and discharge flows to and from the feed section are at substantially identical conditions, except as to enrichment, no further treatment is required for such recycling to maintain the entire system in stable operation, inasmuch as the other flows of the process water and gas through the towers comprise circulations operating independently of the feed supply. In addition, the sea-water recycle provides advantages during normal operation of the system to effect an increased extraction of the deuterium contained in the feed which may be utilized to increase the productivity of the system or to reduce the quantity of sea water to be treated for delivery to the system or both. Use of the sea-water recycle serves to lower the concentration of the sea-water supply to the feed section, which in turn reduces the enrichment attained by the gas at the top of the feed section, which in turn effects a greater impoverishment in the process water recycling from the hot tower via 107A to the cold tower via 9A and in turn effects greater impoverishment of the gas recirculating from the cold tower to the hot tower, whereby the water discharging from the bottom of the hot tower, e.g. sea-water from the bottom of the feed section, is more impoverished with a resultant increase in the extraction of deuterium per unit quantity of the sea-water feed supplied to the feed section.

The relation of the by-pass preceding the intake of the feed-water pump P-003-2 corresponds to the valved by-pass q5a shown in FIG. 5a, and is more fully shown and described in concurrently filed application Ser. No. 126,498.

The process water flows downward through the cold tower and is enriched with deuterium as it contacts the countercurrent flow of deuterium enriched $H_2S$ gas therein. This cold deuterium enriched water, mixed with the cooled recycling water flows from 14A, 17A and 20A, is heated in the dehumidification system below the cold tower and is discharged therefrom, together with the condensate formed by cooling of the hot humidified gas from 40A, via 10A. One part thereof via 11A is passed to the top of the stage 1 hot tower as heated process water; and a second part thereof via 12A is passed to the branched heat exchanger train E-101-, E-102-, E-103- wherein it is differentially cooled and returned in the three streams 14a, 17A and 19A-20A to the levels of corresponding temperature in the dehumidification section.

The water flows to the humidification section under the hot tower TH-101-2 consist of the flow via 102A from the recycle tower and the flow via 31A of circulated water of the 4 branches 35A, 34A, 43A and 24A of the second cyclic flow system, which branches are withdrawn from the countercurrent humidification section in three streams, upper, middle and lower, by the pumps, P-104-2, P-103-2 and P-102-2.

The discharges from these pumps pass through the indirect contact heat exchangers E-101-, E-102-, E-103- and E-105- in differential series, as shown, to recover heat from the above described branched cyclic flow associated with the dehumidification section and from the process water being recycled from the hot tower to the cold tower via 107A. In the course of the heating in these several heat exchangers, $H_2S$ gas is evolved from the water. The heated streams are therefore passed through gas separators D-101-, D-102-, D-103- and D-105- from which the collected gas is returned via 59A to the hot tower. Parts of the water in 35A, 34A and 43A pass to corresponding differential heat exchangers in stages 2 and 3 in parallel arrangement to those in stage 1, and the combined heated streams return via 31A to the humidification section below the stage 1 hot tower.

Deuterium enriched process water passing through the dehumidification section from the cold tower TC-101-2 cools and dehumidifies the countercurrent gas stream from 40A. The water is withdrawn from the bottom of the dehumidification section via 10A and a part thereof is passed, via 12A, to the heat exchanger means E-101- as above described. A portion of the discharge from such heat exchanger means is returned to the dehumidification section via 13A and 14A as the lower dehumidification stream. The remainder passes via 13A and 15A through a second heat exchanger means E-102- and a portion is delivered via 16A and 17A as the middle dehumidification stream. The rest of the dehumidification water via 16A and 18A passes through a third heat exchanger means E-103- and two coolers E-114-2 and E-104-2. A portion of this water, via 20A, is passed to the dehumidifier section as the upper dehumidification stream; the rest is pumped to the top of the cold tower of stage 2 via 52A and 9B.

Stage 2, FIG. 10, operates with one set of towers; a hot tower TH-201 and a cold tower TC-201. The stage 2 hot tower is a vertical pressure vessel consisting only of a water impoverishing or deuterium stripping section. It is approximately 18 feet in diameter and approximately 130 feet high. The cold tower is part of a pressure vessel approximately 16 feet in diameter and approximately 195 feet high which includes the cold tower water enriching section over a hydrogen sulfide gas dehumidification section. Both towers are made of carbon steel and use stainless steel sieve trays.

There are no sea-water feed sections or gas humidification sections in stages subsequent to stage 1. Hot humidified $H_2S$ gas from stage 1 via 38B supplies the process gas for higher numbered stages.

Deuterium enriched $H_2S$ gas from the stage 1 hot towers via 38B enters the bottom of the stage 2 hot tower and passes upward therein stripping more deuterium from the countercurrent flow of process water. The deuterium enriched gas leaves the stage 2 hot tower via 39B and is split into two streams via 38C and 40B. The flow via 38C passes to the bottom of the stage 3 hot tower TH-301; the flow via 40B is delivered to the bottom of the dehumidifier section below the stage 2 cold tower TC-201. The gas passes upward in this dehumidification section in countercurrent direct contact with a branched cyclic flow of cooling water and the water from the cold tower TC-201. In this dehumidification section the hot gas from 40B is cooled and dehumidified and then passed into the cold tower where it merges with the gas recycled from stage 3 via 41C. The gas transfers its deuterium to the countercurrent flow of water and then leaves the cold tower via 41B, from which it was pumped to the cold tower of stage 1 by the stage 2 gas compressor C-201, via 51A, FIG. 9 and 9(alt), above described.

Deuterium enriched process water from the stage 1 cold towers via 52A and 9B is delivered into the top of the stage 2 cold tower TC-201, where it becomes further enriched by picking up deuterium from the countercurrent flow of process gas therein. This deuterium enriched water enters the stage 2 dehumidification section where it mixes with the recirculating branched flow of cooling water and with the condensate formed from the cooling of the hot gas therein.

The heated water withdrawn from the bottom of the stage 2 dehumidifier section via 10B is split into two streams, one of which is pumped via 12B through branched circuits comprising heat exchanger means E-201, E-202, E-203 and is returned at differential temperatures to corresponding temperature levels of the stage 2 dehumidification section via 14B, 17B and 19B–20B; the other being pumped by the pump P-208 to the stage 2 hot tower via 11B.

Process water recycled from stage 3 via 23C joins the process water stream from 11B to the top of the hot tower TH-201 and these combined streams flow downward in the tower TH-201 and are stripped of deuterium by the counter-current flow of $H_2S$ gas therein. The process water is discharged from the bottom of this hot tower via 23B and is returned to the stage 1 hot towers by pump P-201.

The greater part of the process water withdrawn via 10B from the dehumidification section at the bottom of the stage 2 cold tower is recycled via 12B. This water is cooled and introduced into the dehumidification section below the cold tower TC-201 in three streams, as above described. In more detail, the pump P-202 pumps the water via 12B through the heat recovery exchanger means E-201, cooling the water. A portion of the so cooled water via 13B and 14B passes to the dehumidification section as the lower stream thereto; the rest is pumped by the pump P-204 to the heat recovery exchanger means E-202, and a portion of the further cooled water therefrom via 16B and 17B becomes the middle dehumidification steam; the remainder thereof via 16B, 18B passing through heat exchanger means E-203 and thence through two coolers E-214 and E-204. A portion of the stream of cold water from E-204 passes via pump P-303 and 9C to the top of the stage 3 cold tower TC-301 as process water; and the remainder enters the top of the stage 2 dehumidification section via 20B.

Stage 3, following stage 2 in FIG. 10, is essentially a repetition of stage 2 operating at a higher degree of enrichment and with relatively smaller volumes of fluids in correspondingly smaller apparatus, and the arrangement of the like elements of stage 2; the items of equipment being designated by the same reference numerals in a "300" series as compared to those in a "200" series in stage 2 and a "100" series in stage 1; and the corresponding piping of the stages being designated by like numerals but with the ascribed "C" for stage 3, "B" for stage 2, and "A" for stage 1.

As indicated in connection with the stage 3 diagram, FIG. 10, this stage may be followed by one or more further enrichment stages. As there indicated such may be of the dual temperature exchange type employed in the earlier stages, but the invention is not limited in this regard and further enrichment may be effected in any appropriate way. Since the stages herein described may effect some 500 to 1000 fold enrichment representing more than 90% of the total capital and operating costs to achieve a final product concentrate of 99.8 mol percent $D_2O$, the type of system utilized for the final enrichment whether it be of any of the known dual temperature types, water distillation types, or electrolytic types, or combinations thereof, is not of major importance and forms no part of the present invention.

Another aspect of the present invention indicated in FIGS. 9 and 10, resides in improvements which enable a multiple stage plant to be established for the production of final product at one rate, e.g. 200 tons per year, with provision for a reduction or expansion of its capacity by addition or subtraction of parallel first stage hot and cold tower pair systems, without need for altering the volumetric equipment in the following stages.

In FIGS. 9(alt) and 10, the illustrated stages comprising a first stage having two identical parallel tower pair systems and second, third and fourth stages of one pair each are capable of enriching material sufficient to yield 200 tons per year of final product; by effecting a 3-fold enrichment of the deuterium content of the process water delivered via 9B (FIG. 9(alt) and FIG. 10) to the second stage cold tower, as compared to the sea-water feed entering the first stage via 55A; followed by a further 9-fold enrichment in stage 2, a further 16.2-fold enrichment in stage 3, leaving only a 16.1 fold enrichment to be imparted by the final enrichment system to achieve the approximately 7,000-fold enrichment constituting the final product.

According to the expansion concept of the present invention, by adding two additional sets of stage 1 sections connected between the "gang" symbols of FIG. 9, and maintaining the same total volume flows from stage 1 to the following stages, i.e. halving the volume flows from each of said tower pairs of stage 1 to the second stage, the former 3-fold enrichment in the first stage is increased to a 6-fold enrichment, without adding any additional equipment in the subsequent stages. To achieve this result the tower pair sections of the first stage are constructed with sufficient trays in the hot and cold towers to accommodate a 6-fold enrichment at half the contemplated volumetric withdrawal rate of fluids to the second stage, and until such time as the third and fourth parallel sections are installed, the withdrawal rates from the first and second parallel sections are set at twice the rates contemplated for the 6-fold enrichment, thus delivering four units of volume at 3-fold enrichment rather than two units of volume at 6-fold enrichment, at a nominal sacrifice of optimum tower efficiency. Thus when the third and fourth ganged sections are installed, the total withdrawal to the second stage previously supplied from two first stage sections, is divided between the four first stage sections, thus reducing the withdrawal rate per section to that a which each section affords a 6-fold enrichment at full efficiency as originally contemplated. When gas is transferred between the first and second stages as shown, the reduced withdrawal of gas from the individual sections of the first stage results in about 25% increase in the gas flows in each of the dehumidifying sections below the cold towers of the first stage. Thus when third and fourth tower pair units are added, the heat recovery exchangers E-101-, E-102-, and E-103-, have their capacities increased proportionately by added parallel units thereof as indicated at XE-101-, XE-122-, and XE-123-, with similar increase in the coolers E-114- and E-104- as indicated at XE-124-, to condition the increased gas flow.

Conversely, with the first stage consisting of "ganged" parallel sections it becomes possible to shut down for maintenance, or otherwise, less than all of the "ganged" sections of the first stage, provided the ultimate size of the final enrichment treatment (by whatever method) is constructed to accommodate substantially the same volume of input, but at a reduced concentration proportionally corresponding to the minimum concentration to be delivered to the second stage from the first stage at such time. In light of the quite small quantities of fluids to be handled by the final enrichment system for the ultimate product, the cost of providing it with such capability is essentially nominal. With such arrangement the enrichment multiplication factor of the intermediate stages remains substantially constant with constant volume total input from the parallel first stage sections and constant volume output to the final enrichment system. Also with this arrangement, during such partial shutdown there is no need to reduce the extra capacities of the heat recovery exchangers XE-101-, etc., as the excess capacity thereof actually increases the overall efficiency of the heat recovery system in such circumstances, with consequent reduction in the quantity of steam required to be supplied via 114A.

Thus by this improvement of the present invention the limited additional capital investment of 25%, more or less, of the exchange portions of the hot and cold towers of the first stage only of the initial plant, with no significant added investment in any other part of the initial plant, provides a plant which can be expanded to double its initial product output capacity at only a fraction of the cost of duplicating a plant without such improvement; and similar advantages may be obtained in other embodiments of this invention contemplating other capacity expansions, e.g. from a single pair of first stage towers to two, three, four or even more pairs thereof as contemplated by the "gang" symbols in FIG. 9, for which purpose, the extra plates required to be installed in the initial plant to provide for multiplications of the enrichment by stage 1 in such proportions progressively decrease as the degree of enrichment increases.

As an alternative in this aspect of the invention, the tower units of the initial construction may be constructed without the additional plate capacity, and may be extended by the connection of further tower sections in series therewith to provide said additional capacity at the time the further first stage tower units are connected in parallel therein.

While there have been described herein what are at present considered preferred embodiments of the invention, it will be obvious to those skilled in the art that modifications, including changes and omissions and substitutions, may be made without departing from the essence and principle of the invention. It is therefore to be understood that the exemplary embodiments are illustrative and not restrictive of the invention, the scope of which is defined in the appended claims, and that all modifications that come within the meaning and range of equivalency of the claims are intended to be described and included therein.

I claim:

1. Improved apparatus for producing a fluid containing a first material concentrated therein, by exchanging at two different temperatures said first material with a second material between chemically different first and second fluid phases which are physically separable from each other and which are each capable of containing each of said materials, said apparatus being of the type which comprises
    (a) a pair of exchange units and means connected thereto for passing said second fluid phase through each of the second and first units of said pair in that order, and for also passing flows of said first fluid phase in countercurrent contact with said second fluid phase in said first and second units of said pair,
    (b) means for maintaining said first and second units at different temperatures to cause said second fluid phase to become enriched in said first material in passing through said second unit, and to become impoverished in said first material in passing through said first unit, of said pair, and to cause the first fluid phase to become enriched in said first material in passing through said first unit and to become impoverished in said first material in passing through said second unit of said pair of units, and
    (c) means connected to said units for passing enriched first fluid and second fluid between said units and for withdrawing a part of at least one of said enriched fluids;

and the improvement comprising, in combination with the foregoing:
    (d) first means, including conduits, connected to said second unit for delivering thereto a first flow of said first fluid phase containing said materials from a source external to said pair of units, for discharging said first flow therefrom, and for passing said first flow in countercurrent contact with said impoverished second fluid in a first delivery-to-discharge path through a portion only of said second unit proximate to its end at which said fluid phases are most impoverished in said first material, and
    (e) second means comprising delivery and discharge conduits connected to said units for passing a second flow of first fluid phase in a second delivery-to-discharge path in said units exclusive of said first path in countercurrent contact with said second fluid phase therein and as said enriched flow of first fluid between said units.

2. Improved apparatus as claimed in claim 1, wherein
    (f) said second means also comprises conduits connected to said first and second units for at least in part recirculating the second flow of first fluid phase from said second unit to said first unit.

3. Improved apparatus as claimed in claim 2, wherein
    (g) said second means is connected to deliver to said units a flow of first fluid phase which is at least in part a flow of first fluid from a source containing substantially the same concentrations of said materials as that from which said first means delivers said first flow of first fluid phase to said second unit.

4. Improved apparatus as claimed in claim 2, wherein said first means is connected to a source of saline water which is delivered as said first flow of said first fluid phase and said second means is connected to a separate source of water that is relatively free of saline content.

5. Improved apparatus as claimed in claim 1 wherein:

(f) said second means comprises recirculating means connected to said units for recirculating at least a part of only said second flow of first fluid phase through said second delivery-to-discharge path.

6. Improved apparatus as claimed in claim 5, wherein:
(g) said second means comprises recirculating means connected to said units for recirculating all of said second flow of first fluid phase passing through said second delivery-to-discharge path.

7. Improved apparatus as claimed in claim 1, wherein:
(f) said second means comprises a direct contact means and connections thereto for passing therethrough in countercurrent contact at least part of said second flow of first fluid phase passing from said second delivery-to-discharge path and recirculated second fluid phase delivered to said second unit.

8. Improved apparatus as claimed in claim 7, wherein:
(g) said second means comprises connections for mixing said second flow of first fluid phase passing from said second delivery-to-discharge path with the first flow of first fluid phase delivered to said second unit referred to in clause (d).

9. Improved apparatus as claimed in claim 7, wherein:
(g) said second means comprises elements for maintaining said second flow of first fluid phase passing from said second delivery-to-discharge path out of contact with the first flow of first fluid phase referred to in clause (d),
(h) means connected to said units: (1) for dividing said recirculated second fluid phase delivered to said second unit into separated flows; (2) for conducting one of said separated flows to the direct contact means referred to in clause (f); (3) for passing the other of said separated flows through the portion of said second unit referred in clause (d); and (4) for recombining said separated flows of second fluid for passage in countercurrent exchange in the portions of said first and second units traversed by the second delivery-to-discharge path referred to in clause (e).

10. Improved apparatus as claimed in claim 7, wherein:
(g) said second means comprises return conduit means connected to said units for returning at least a portion of the second flow of first fluid phase referred to in clause (f), after the countercurrent contact referred to in clause (f), to recirculate in countercurrent contact with said second fluid phase in the path referred to in clause (e).

11. Improved apparatus as claimed in claim 10, wherein the concentration of first material in (I) the returned first fluid flow referred to in clause (g) is less than the concentration of first material in (II) the first fluid flow delivered to the path referred to in clause (e), said apparatus comprises means connected to said first unit at a place where said flow (I) has become enriched to a concentration of first material substantially corresponding to that of said flow (II) for delivering said flow (II) to said first unit and mixing the same with said flow (I).

12. Improved apparatus as claimed in claim 11, wherein said apparatus further comprises withdrawal means for withdrawing flow (II) fluid from said second unit connected to said second unit at a place where the flow of first fluid therein has a concentration of first material greater than the concentration of first material in the returned flow (I) referred to in clause (g).

13. Improved apparatus as claimed in claim 12, wherein said withdrawal means is connected to said second unit at a place where the flow of first fluid therein has a concentration of first material substantially corresponding to that of the delivered first flow of first fluid phase referred to in clause (d).

14. Improved apparatus as claimed in claim 11, wherein:
(h) said second means comprises elements for maintaining said second flow of first fluid phase passing from said second delivery-to-discharge path out of contact with the first flow of first fluid referred to in clause (d), and said apparatus further comprises
(i) means connected to said units: (1) for dividing said recirculated second fluid phase delivered to said second unit into separated flows; (2) for conducting one of said separated flows to the direct contact means referred to in clause (f); (3) for passing the other of said separated flows through the portion of said second unit referred to in clause (d); and (4) for recombining said separated flows of second fluid for passage in countercurrent exchange in the portions of said first and second units traversed by the second delivery-to-discharge path referred to in clause (e).

15. Improved apparatus as claimed in claim 1, wherein:
(f) said first means comprises recirculating means connected from the discharge end to the delivery end of said first delivery-to-discharge path, and adjustable for maintaining the quantity of flow of said first fluid phase passing in said first delivery-to-discharge path substantially the same when the delivery of said first flow of first fluid phase from said source is discontinued in whole or in part.

16. Improved apparatus for producing a fluid containing a first material concentrated therein, by exchanging at two different temperatures said first material with a second material between chemically different first and second fluid phases which are physically separable from each other and which are each capable of containing each of said materials, said apparatus being of the type which comprises
(a) a pair of exchange units and means connected thereto for passing said second fluid phase through each of the second and first units of said pair in that order and for also passing flows of said first fluid phase in countercurrent contact with said second fluid phase in said first and second units of said pair,
(b) means for maintaining said first and second units at different temperatures to cause said second fluid phase to become enriched in said first material in passing through said second unit and to become impoverished in said first material in passing through said first unit, of said pair, and to cause the first fluid phase to become enriched in said first material in passing through said first unit and to become impoverished in said first material in passing through said second unit of said pair of units, and
(c) means connected to said units for passing enriched first fluid and second fluid between said units and for withdrawing a part of at least one of said enriched fluids;
and the improvement comprising, in combination with the foregoing:
(d) said means of (a) including conduits connected to said units for delivering thereto a flow of said first fluid phase containing said materials from a source external of said pair of units, for discharging said first flow therefrom, and for passing said first flow in countercurrent contact with said second fluid in a delivery-to-discharge path passing through at least a portion of the extent of said first unit and at least in part through the full extent of said second unit, and (e) recirculating means comprising conduits connected to said units for returning at least a portion of said flow of first fluid phase which has passed through the full extent of said second unit to recirculate in countercurrent contact with said second fluid phase throughout the entire extent of said first unit, and (f) recycling means comprising conduits connected to said units for returning the impoverished second fluid phase from said first unit to said second unit for the passage referred to in clause (a).

17. Improved apparatus as claimed in claim 16, in which the first fluid from the source referred to in clause (d) has a higher concentration of first material therein than the returning flow referred to in clause (e), said apparatus comprising means connected to said units for delivering the first fluid from said source to said first unit and mixing it with said flow of first fluid referred to in clause (e) at a place where the latter has become enriched to a concentration of first material substantially corresponding to that of said source.

* * * * *